(12) United States Patent
Takagi

(10) Patent No.: US 8,766,498 B2
(45) Date of Patent: Jul. 1, 2014

(54) ELECTRIC GENERATOR WITH COOLING SYSTEM AND HYBRID VEHICLE INCORPORATING ELECTRIC GENERATOR

(75) Inventor: Izumi Takagi, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 279 days.

(21) Appl. No.: 13/341,771

(22) Filed: Dec. 30, 2011

(65) Prior Publication Data

US 2013/0169118 A1 Jul. 4, 2013

(51) Int. Cl.
*H02K 7/00* (2006.01)
*H02K 9/00* (2006.01)

(52) U.S. Cl.
USPC ............. 310/67 R; 310/55; 310/58; 310/60 A

(58) Field of Classification Search
CPC .................................. H02K 7/14; F16H 57/02
USPC ...... 310/52–58, 60 R, 61–62, 67 R, 75 R, 98, 310/102 R, 113, 118; 123/41.01; 180/65.1
See application file for complete search history.

(56) References Cited

U.S. PATENT DOCUMENTS 1,778,036 A * 10/1930 Noble et al. .................. 290/1 B
2,827,580 A * 3/1958 Jaeschke ........................ 310/105
4,958,095 A * 9/1990 Uchida et al. .................... 310/59

FOREIGN PATENT DOCUMENTS

JP 2002-004860 A 1/2002
WO WO 9962167 A1 * 12/1999

* cited by examiner

*Primary Examiner* — Tran Nguyen
*Assistant Examiner* — Jose Gonzalez Quinone
(74) *Attorney, Agent, or Firm* — Alleman Hall McCoy Russell & Tuttle LLP

(57) ABSTRACT

An electric generator incorporated into a hybrid vehicle including an engine and an electric drive motor and actuated by the engine, comprises a rotor mounted to one end portion of a crankshaft of the engine such that the rotor is rotatable integrally with the crankshaft; a cylindrical accommodating member surrounding an outer periphery of the rotor; and an air outlet provided on a peripheral wall portion of the accommodating member such that the air outlet opens in the vicinity of the outer periphery of the rotor and is tilted in a forward direction of a rotational direction of the rotor and in a radially outward direction.

17 Claims, 11 Drawing Sheets

ELECTRIC GENERATOR WITH COOLING SYSTEM AND HYBRID VEHICLE INCORPORATING ELECTRIC GENERATOR

BACKGROUND OF THE INVENTION

1. Field of the Invention

The present invention generally relates to a structure of an electric generator incorporated into a hybrid vehicle. More particularly, the present invention relates to a cooling system for cooling the electric generator in the hybrid vehicle.

2. Description of the Related Art

In an exemplary hybrid vehicle including an engine and a drive motor as driving power sources, a water-cooling system includes a radiator for cooling the engine, an electric generator, an electric motor, an inverter, and other components. For example, Japanese Laid-Open Patent Application Publication No. 2002-4860 discloses a water-cooling system in which the electric generator, the electric motor, and the inverter are provided with cooling jackets, respectively and cooling water is circulated between the radiator and the water jackets. In this water-cooling system, convection heat transfer of a liquid phase is performed between the cooling water, and the electric generator and the electric motor which have relatively lower heat generation densities, thereby transferring and removing heat from the electric generator and the electric motor, while boiling heat transfer is performed between the cooling water and the inverter having a higher heat generation density, thereby transferring and removing heat from the inverter.

Among hybrid vehicles, in a series-hybrid vehicle in which an engine is mechanically separated from drive wheels, an electric generator can be actuated while maintaining the engine having a relatively low driving power output, in a high-efficiency running range. For this reason, in vehicles such as a golf cart or a farming truck, which do not require a high mobility, heat generation could not be problematic.

In the conventional water-cooling system, a radiator, cooling water pipes, and a cooling water pump are required, and a total weight of these components and the cooling water tends to be great. These components increase costs and are difficult to lay out.

As a solution to this, a forcible air-cooling system including a fan operative according to the operation of a rotor of the electric generator or the electric motor may possibly be used. However, under a low-load state, the electric generator does not require forcible air-cooling. In such a situation, air friction resistance generated by the rotation of the fan will result in a driving loss. Moreover, the fan increases costs.

SUMMARY OF THE INVENTION

The present invention addresses the above described condition, and an object of the present invention is to provide a cooling system in a hybrid vehicle with a simple configuration, which is suitable for a case where an electric generator actuated by an engine generates less heat, and results in less driving loss without increasing costs.

According to one aspect of the present invention, an electric generator incorporated into a hybrid vehicle including an engine and an electric drive motor and is actuated by the engine, comprises a rotor mounted to one end portion of a crankshaft of the engine such that the rotor is rotatable integrally with the crankshaft; a cylindrical accommodating member surrounding an outer periphery of the rotor; and an air outlet provided on a peripheral wall portion of the accommodating member such that the air outlet opens in the vicinity of the outer periphery of the rotor and is tilted in a forward direction of a rotational direction of the rotor and in a radially outward direction. In accordance with the electric generator having this configuration, the air flow generated in the vicinity of the rotor rotating is pushed out toward the air outlet in the vicinity of the rotor and discharged from the accommodating member through the air outlet. Thereby, an internal pressure in the accommodating member decreases, and the outside air is introduced into the accommodating member, and facilitates heat radiation from the rotor and the stator. Since air frictional resistance will not increase unlike in an electric generator provided with a fan, an increase in driving loss can be suppressed significantly. In addition, costs will not increase.

The air outlet may be provided on the peripheral wall portion of the accommodating member such that the air outlet is at one end side in a rotational axis direction of the rotor; and the accommodating member may be provided with an introduction port on an opposite end side in the rotational axis direction of the rotor, the introduction port being located at an upstream side relative to the rotor in an air flow direction. In this structure, the outside air introduced into the accommodating member through the introduction port flows from the opposite end side to the one end side in the rotor rotational axis direction and is discharged through the air outlet. By the air flow from introduction port to the air outlet, heat radiation from the rotor and the stator is facilitated effectively.

When the rotor includes a hub fastened to the one end portion of the crankshaft and a drum surrounding an outer periphery of the hub such that the hub and the drum are spaced apart from each other, and a stator having an electromagnetic coil is disposed between the hub and the drum, the introduction port may be positioned inward relative to the drum when viewed in the rotational axis direction of the rotor. In this structure, when the outside air introduced into the accommodating member through the introduction port inward relative to the drum of the rotor is flowing in a radially outward direction, and is discharged through the air outlet provided on the outermost portion of the accommodating member, heat radiation from the electromagnetic coils of the stator and the like is facilitated effectively.

The introduction port may include a plurality of introduction ports arranged to be spaced apart from each other in a circumferential direction around the rotational axis of the rotor; and a passage may be provided between the accommodating member and the engine to guide outside air from the outer periphery of the accommodating member to the plurality of introduction ports. If the plurality of introduction ports correspond to a plurality of electromagnetic coils of the stator, respectively, the outside air is guided directly to the electromagnetic coils generating heat with a great amount, and heat radiation from the electromagnetic coils is facilitated effectively.

A narrower space may be provided between the peripheral wall portion of the accommodating member and the outer periphery of the rotor in the vicinity of the air outlet. In this configuration, in the narrower space, the air moving according to the rotation of the rotor can be discharged efficiently through the air outlet.

When the engine is placed such that the crankshaft extends vertically in the hybrid vehicle, the rotor may be mounted to a lower end portion of the crankshaft. In this configuration, even when high-temperature air in the vicinity of the engine moves up by convection, during a stopped state of the hybrid vehicle, a temperature of the electric generator disposed at a downstream side of the engine will not rise.

According to another aspect of the present invention, a hybrid vehicle including an engine and an electric drive motor comprises an electric generator mounted to the engine, and includes: a rotor mounted to one end portion of a crankshaft of the engine such that the rotor is rotatable integrally with the crankshaft; a cylindrical accommodating member surrounding an outer periphery of the rotor; and an air outlet provided on a peripheral wall portion of the accommodating member such that the air outlet opens in the vicinity of the outer periphery of the rotor and is tilted in a forward direction of a rotational direction of the rotor and in a radially outward direction.

The above and further objects, features and advantages of the invention will more fully be apparent from the following detailed description with reference to the accompanying drawings.

DETAILED DESCRIPTION OF THE PREFERRED EMBODIMENTS

Figure 1:
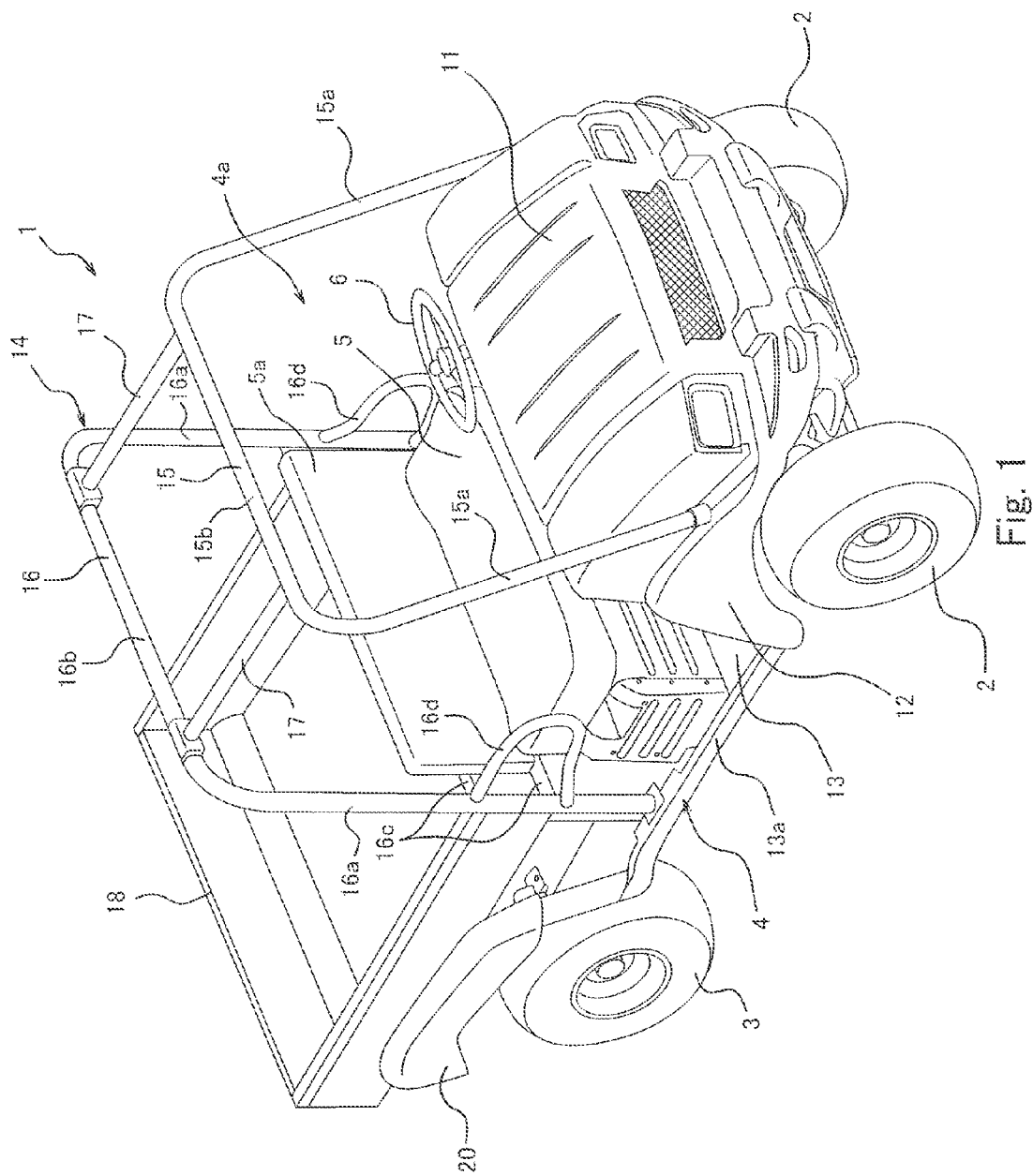
FIG. 1 is a perspective view of a hybrid vehicle according to an embodiment of the present invention, when viewed from leftward and obliquely forward.

Hereinafter, an embodiment of the present invention will be described with reference to the drawings. Throughout the drawings, the same or corresponding components are identified by the same reference numerals and will not be described in repetition. The stated directions are referenced from the perspective of a driver riding in a hybrid vehicle.

Figure 2:
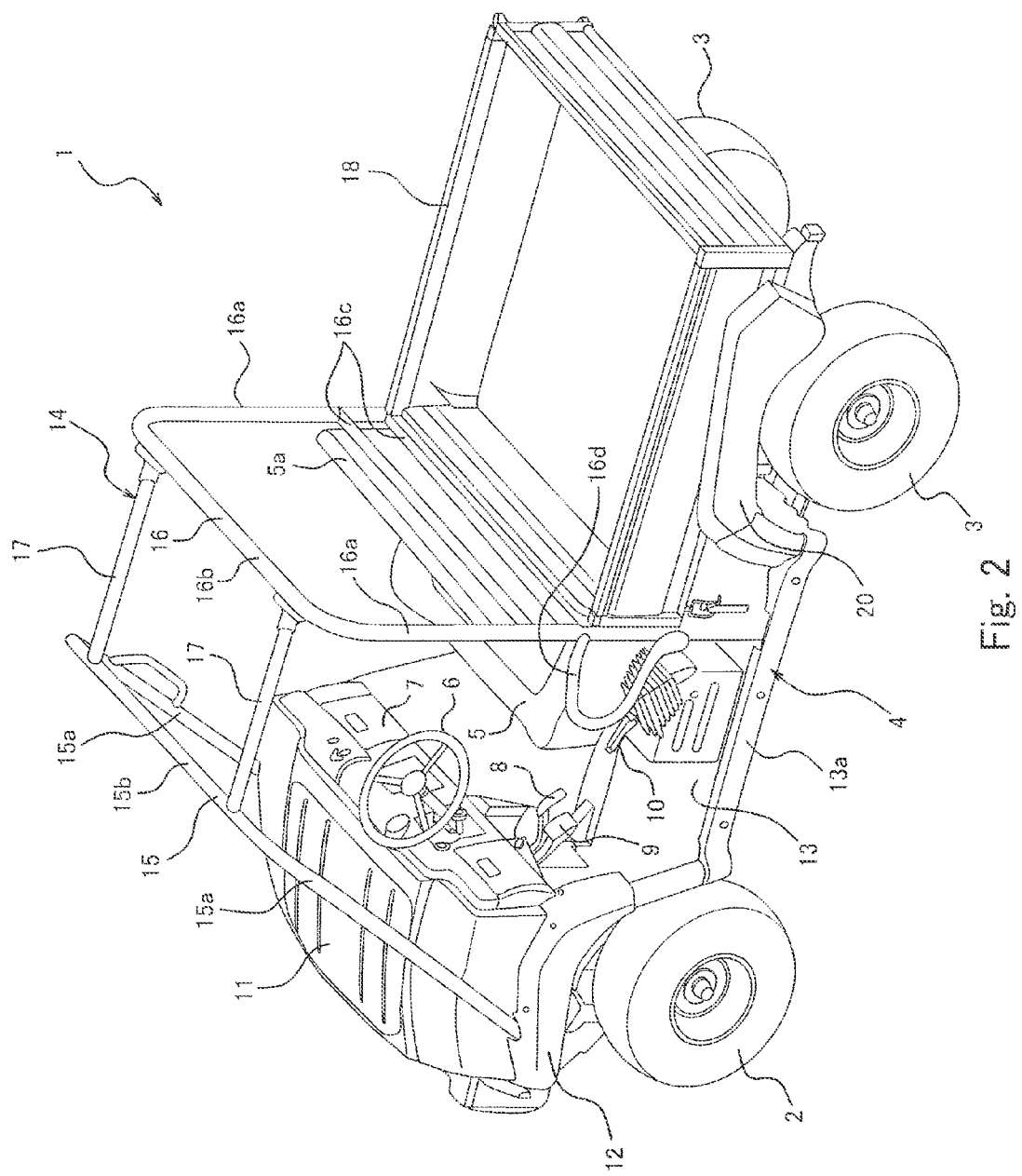
FIG. 2 is a perspective view of the hybrid vehicle, when viewed from rightward and obliquely rearward.
Figure 3:
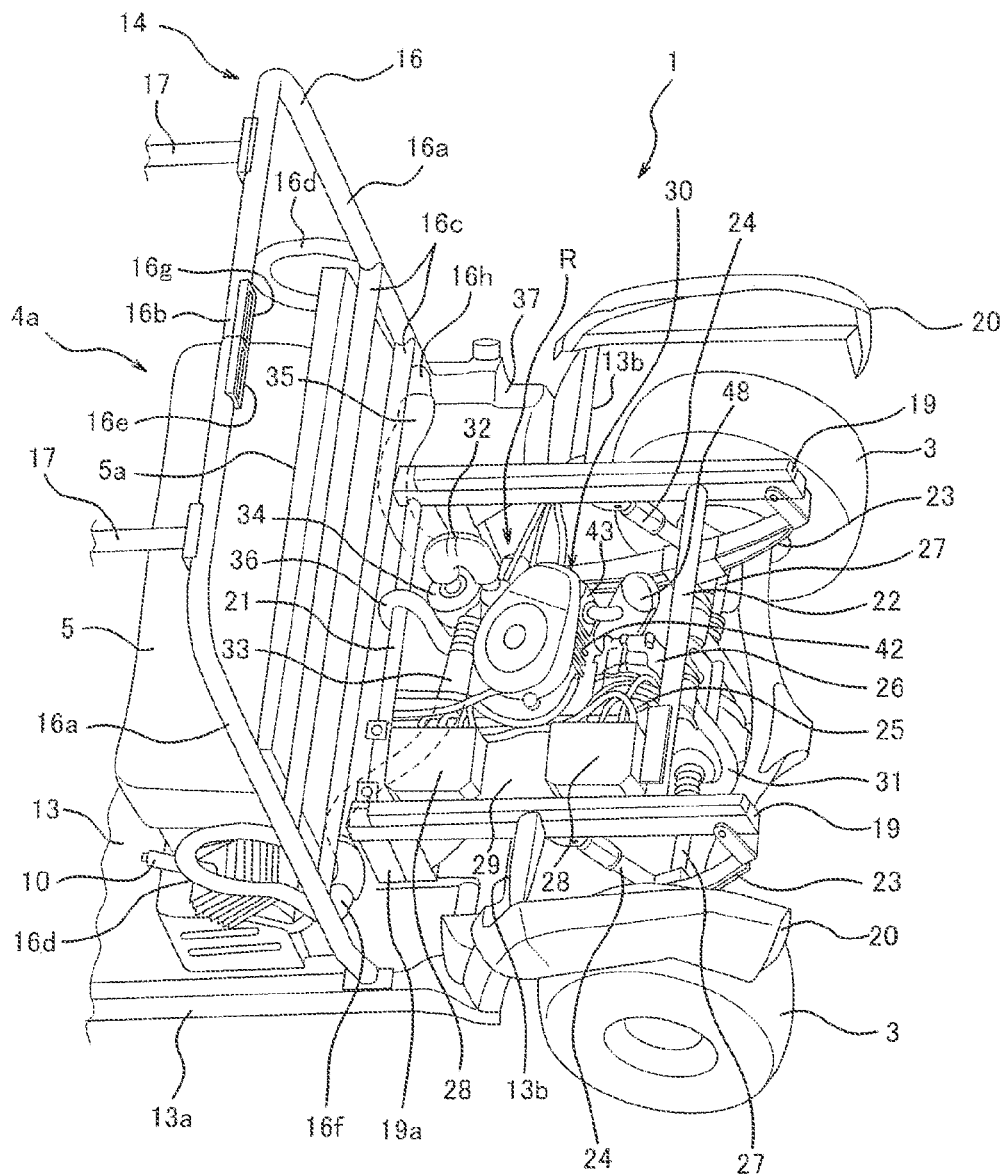
FIG. 3 is a view of the hybrid vehicle corresponding to FIG. 2, showing the interior of an engine room, in a state where a cargo bed is detached.
Figure 4:
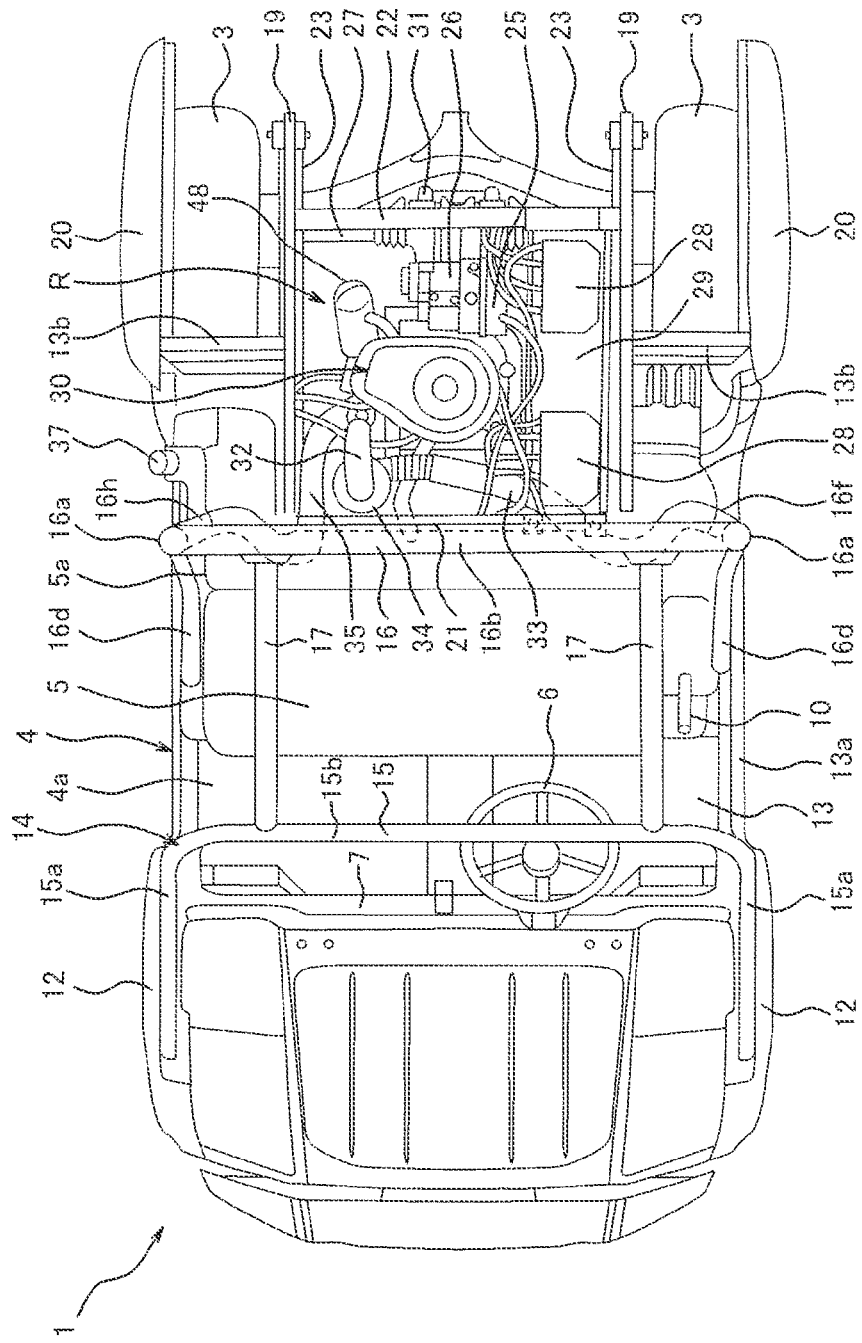
FIG. 4 is a plan view of the hybrid vehicle, showing the interior of the engine room, in a state where the cargo bed is detached.

FIGS. 1 and 2 are perspective views of an external appearance of a utility vehicle 1 which is an embodiment of the hybrid vehicle according to the present invention. FIGS. 3 and 4 are a perspective view and a plan view of the utility vehicle 1, respectively, showing the interior of an engine room, in a state where a cargo bed is detached. Referring to FIGS. 1 and 2, the utility vehicle 1 includes right and left front wheels 2, right and left rear wheels 3, and a vehicle body 4 from which the wheels 2 and 3 are suspended. A cabin space 4a for passengers is provided in a center portion of the vehicle body 4 in a forward and rearward direction (lengthwise direction of the utility vehicle 1). A bench seat 5 (driver seat) which is laterally elongated is provided in a substantially center portion of wheel bases of the front and rear wheels 2 and 3. As used herein, the utility vehicle refers to a multi-purpose vehicle, for example, a golf cart, a farming truck, etc.

The front wheels 2 of the utility vehicle 1 are steering wheels and are turned to the right or to the left according to driver's steering of the handle 6. As shown in FIG. 2, the handle 6 is supported on a handle post extending upward from the dash board 7 such that it is tilted slightly rearward. Below the handle 6, an accelerator pedal 8 and a brake pedal 9 are provided. The driver seated on a left portion of the seat 5 can depress the accelerator pedal 8 or the brake pedal 9, while gripping the handle 6. A side brake lever 10 is provided in the vicinity of the left end of the seat 5 to allow the driver to easily operate the side brake lever 10 with a left hand.

The front portion of the vehicle body 4 which is forward relative to the cabin space 4a is covered with a hood 11 extending forward from the upper end of the dash board 7. Front fenders 12 are provided at right and left sides of the hood 11 such that the front fenders 12 are disposed at lower levels than the hood 11 and cover the outer portions of the right and left wheels 2, respectively, from above. Below the hood 11, there are provided front suspension devices (not shown) which suspend the right and left front wheels 2 such that the right and left front wheels 2 are vertically pivotable, and a steering device (not shown) for turning the front wheels 2 according to the driver's steering of the handle 6. In addition, there are provided a front drive motor (not shown) which is an electric motor for driving the front wheels 2, a reduction gear mechanism and a differential gear mechanism (not shown), for transmitting a driving power of the front drive motor, etc.

In brief, the utility vehicle 1 of the present embodiment is a four-wheel-drive vehicle configured to drive the front wheels 2 by the front drive motor, and drive the rear wheels 3 by a rear drive motor 25 as described later. The utility vehicle 1 has an excellent mobility on unpaved roads, and can achieve high fuel efficiency by actuating the front drive motor or the rear drive motor 25, or the front drive motor and the rear drive motor 25, depending on a driving state of the utility vehicle 1.

A floor panel 13 extends rearward from the lower end of the dash board 7 in the cabin space 4a. Although not shown, there are provided on the lower surface of the floor panel 13 a pair of right and left main frames sandwiching a center member extending in a forward and rearward direction, in a substantially center portion of the lower surface, and floor side frames constituted by, for example, round pipe members and extending along side sills 13a at right and left edges of the floor panel 13, respectively, to provide desired floor stiffness. A cabin frame 14 is provided to define the right and left ends and the upper end of the cabin space 4a. The cabin frame 14 is a roll cage (ROPS).

Referring to FIGS. 1 and 2, the cabin frame 14 includes a substantially-U-shaped front frame member 15 defining the front of the cabin space 4a, and a substantially-U-shaped rear frame member 16 defining the rear of the cabin space 4a. The front frame member 15 includes a pair of right and left support elements 15a extending upward from the right and left front fenders 12, respectively, such that the support elements 15a are tilted in a slightly rearward direction, and a cross beam 15b provided between and coupled to the upper ends of the support elements 15a. The support elements 15a and the cross beam 15b are constituted by, for example, round pipes and have a unitary structure. Likewise, the rear frame member 16 includes a pair of right and left support elements 16a, and a cross beam 16b provided between and coupled to the upper ends of the support elements 16a. The support elements 16a and the cross beam 16b are constituted by, for example, round pipes and have a unitary structure. The support elements 16a extend upward in a substantially vertical direction from the rear portions of the right and left side sills 13a of the floor panel 13, respectively. A pair of right and left longitudinal beams 17 are provided between and coupled to the cross beam 15b of the front frame member 15 and the cross beam 16b of the rear frame member 16.

The rear frame member 16 is provided with a pair of upper and lower cross members 16c constituted by, for example, round pipes, in a location lower than a substantially vertical center. The upper and lower cross members 16c are vertically spaced apart from each other and couple the right and left support elements 16a together. A back rest 5a of the seat 5 is mounted to the upper and lower cross members 16c. Side guards 16d having a substantially U-shape when viewed from the side, are provided to extend forward from the rear support elements 16a, respectively such that the side guards 16d correspond to a range between the upper and lower cross members 16c.

A cargo bed 18 is provided behind and near the cabin space 4a defined by the cabin frame 14 as described above. The cargo bed 18 is substantially as high as the upper and lower cross members 16c. The cargo bed 18 is constituted by, for example, a plurality of steel plates joined together in a rectangular shape. The cargo bed 18 is pivotable upward around a pivot shaft attached to the rear edge of the cargo bed 18. As can be seen from FIG. 3, showing a state where the cargo bed 18 is detached, a pair of right and left rear side frames 19 extend rearward from the rear portion of the floor panel 13 via a pair of coupling members 19a having a rectangular thick plate shape. The rear side frames 19 extend rearward straightly such that the rear side frames 19 are higher than the floor panel 13. The cargo bed 81 is mounted to the upper portions of the rear side frames 19.

The rear side frames 19 are constituted by, for example, square pipe members having a rectangular cross-section. As shown in FIGS. 3 and 4, the rear wheels 3 are disposed outside of the right and left rear side frames 19 in the vehicle width direction, respectively, and rear fenders 20 are provided to cover the outer portions of the rear wheels 3, respectively, from above. Panels 13b are provided forward relative to the rear wheels 3, such that they extend upward and are tilted in a slightly rearward direction from a location a little behind the rear edge of the floor panel 13.

An engine room R is defined inward relative to the right and left rear side frames 19 in the vehicle width direction. A cross member 21 is provided between and coupled to the front end portions of the right and left rear side frames 19. A cross member 22 is provided between and coupled to the rear end portions of the right and left rear side frames 19 such that the cross member 22 overlaps with the axle of the rear wheels 3 when viewed from above. The cross members 21 and 22 are constituted by, for example, round pipes. The front and rear cross members 21 and 22, and the right and left rear side frames 19 constitute a frame assembly defining the engine room R. The frame assembly has a rectangular shape and has a high stiffness.

As shown in FIG. 3, the rear end portions of leaf springs 23 of the rear suspension devices for suspending the rear wheels 3 are mounted to the rear ends of the right and left rear side frames 19, respectively. The leaf springs 23 extend forward and obliquely downward from the rear ends of the rear side frames 19 to which the leaf springs 23 are mounted. The front end portions of the leaf springs 23 are mounted to the rear end of the floor panel 13, although not shown. Hubs of the rear wheels 3 are attached to the center portions of the leaf springs 23, respectively, and the lower end portions of hydraulic dampers 24 are attached to the center portions of the leaf springs 23, respectively, such that the hydraulic dampers 24 are pivotable. The upper end of each of the hydraulic dampers 24 is coupled to the center portion of the corresponding rear side frame 19 in the forward and rearward direction such that the hydraulic damper 24 is pivotable. The hydraulic dampers 24 are extendable and contractible according to the vertical movement of the rear wheels 3, respectively.

As shown in FIGS. 3 and 4, the engine room R accommodates the rear wheel drive motor 25 which is the electric motor for driving the rear wheels 3, and the rear transaxle 26 including the transmission gear mechanism and the differential gear mechanism for transmitting the driving power of the rear drive motor 25, and a pair of front and rear controllers 28 for controlling electric power supply to the front drive motor and to the rear drive motor 25, respectively. The pair of front and rear controllers 28 are placed on a metal-made tray 29 in close proximity to the inner side of the left rear side frame 19 such that they are spaced apart from each other in the forward and rearward direction.

The controllers 28 are coupled to a battery (not shown) positioned below the seat 5 in the cabin space 4a, and are coupled to the front drive motor and to the rear drive motor 25, respectively. The controllers 28 are further coupled to an engine electric generator 30 as described later. Since the controllers 28 are positioned in the vicinity of the battery, the rear drive motor 25 and the engine electric generator 30 such that they are interconnected via the controllers 28, electric power lines through which a large current flows can be reduced in length, and maintenance of the components can be performed easily and efficiently.

Figure 5:
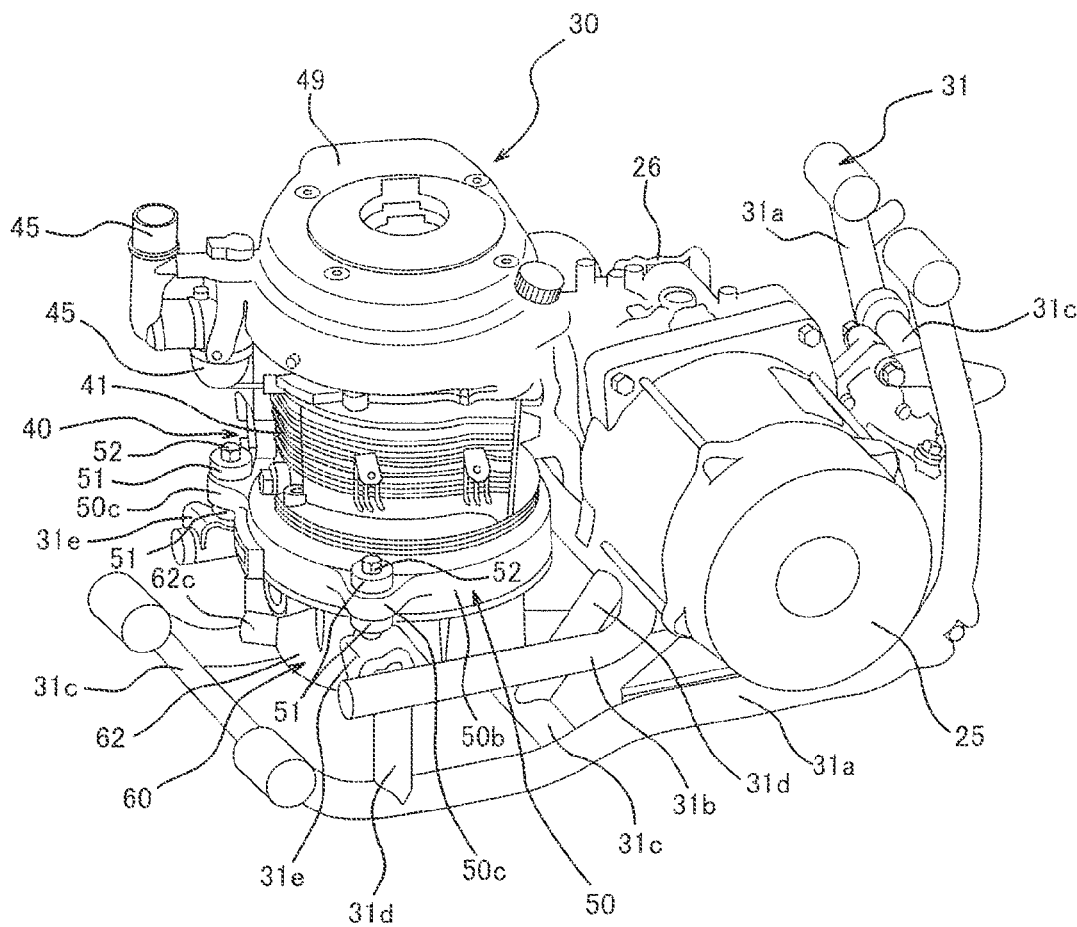
FIG. 5 is a perspective view of an assembly of an engine electric generator and a rear wheel drive motor which are mounted to a sub-frame.

The engine electric generator 30 is activated according to an SOC (state of charge) value of the battery, etc., to generate electric power supplied to the rear drive motor 25. For example, the engine electric generator 30 is placed such that a crankshaft 39 (see FIG. 6) of an engine 40 is oriented to extend vertically. As shown in FIG. 5, the engine electric generator 30, the rear drive motor 25 and the rear transaxle 26 are mounted to the common sub-frame 31 to form an assembly, which is positioned at a substantially center portion of the engine room R.

The sub-frame 31 includes, for example, a pair of right and left main frame members 31a constituted by round pipe members curved in a substantially-J-shape, and a sub-frame member 31b having a U-shape when viewed from above. The right and left main frame members 31a are coupled together by means of three stays 31c spaced apart from each other in the forward and rearward direction. The front end portions of the main frame members 31a are coupled to the rear edge of the floor panel 13 in the cabin space 4a via cylindrical elastic bushes (not shown), while the upper end portions thereof are coupled to the rear cross member 22 via cylindrical elastic bushes (not shown).

In a rear half portion of the sub-frame 31, the rear transaxle 26 is placed within curved portions of the main frame members 31a curved in a substantially-J-shape, and is fastened thereto by means of bolts. The rear drive motor 25 is coupled to the left portion of the rear transaxle 26 such that its rotational shaft is oriented in a rightward and leftward direction. The substantially entire part of the rear drive motor 25 protrudes from the sub-frame 31 to the left. As shown in FIGS. 3 and 4, drive shafts 27 extend from the rear transaxle 26 to the right and left rear wheels 3, respectively.

Turning back to FIG. 5, in a front half portion of the sub-frame 31, the sub-frame member 31b is provided to correspond to a range between the right and left main frame members 31a. The sub-frame member 31b has a U-shape which is open forward when viewed from above. The sub-frame member 31b is provided above the main frame members 31a and coupled to the main frame members 31a by means of a plurality of stays 31d and the stays 31c. Support base members 31e of the engine electric generator 30 are provided at the front end portions of the sub-frame member 31b, which are open end portions of the U-shape, and the rear end portion of the sub-frame member 31b which is the bottom of the U-shape.

A detailed configuration of the engine electric generator 30 will be described, with reference to FIGS. 6 to 9. The engine electric generator 30 has a configuration in which a cylinder of a single-cylinder reciprocating engine 40 is placed horizontally, and an electric generator 60 is coupled integrally to the lower portion of a crankcase 41 via a spacer member 50. The lower end portion of the crankshaft 39 protrudes from the crankcase 41. The spacer member 50 has a substantially disc-shape and is provided with protruding portions 50c extending radially outward from predetermined three portions of its outer periphery. The protruding portions 50c are placed on the support base members 31e of the sub-frame member 31b of the sub-frame 31 via rubber mounts 51, respectively, and are fastened thereto by means of bolts 52.

The engine electric generator 30, which is a unitary unit of the engine 40 and the electric generator 60, tends to be elongated in the direction in which the crankshaft 39 extends. In the present embodiment, the engine electric generator 30 is placed such that its lengthwise direction conforms to a vertical direction. Therefore, an air-intake system, an exhaust system, auxiliary devices, etc., in the vicinity of the engine electric generator 30, can be laid out easily. To be specific, the rear drive motor 25 and the rear transaxle 26 can be positioned in close proximity to the engine electric generator 30 behind the engine electric generator 30. Because of the efficient layout in the limited space of the engine room R, the controllers 28, and other components can be laid out efficiently in the engine room R.

As shown in FIGS. 3 and 4, the engine electric generator 30 is placed in the engine room R such that a cylinder block 42 and a cylinder head 43 of the engine 40 are oriented in a rightward and slightly obliquely rearward direction. The cylinder head 43 and others tend to be elevated in temperature. Therefore, the above stated layout of the engine electric generator 30 has an advantage that the controllers 28 and other components positioned at the left part of the engine room R are protected from the heat radiated from the engine electric generator 30. Since the cylinder head 43 is distant from the cabin space 4a, the driver or a passenger is protected from the heat.

Since the cylinder block 42 and the cylinder head 43 of the engine 40 are oriented in the rightward and slightly obliquely rearward direction, a vibration attributed to the reciprocation of the piston is directed in the rightward and leftward direction or in a slightly obliquely forward and rearward direction. In general vehicles, a horizontal vibration is less likely to be felt by the driver or passenger, as compared to a vertical vibration. In the above layout, the vibration generated in the engine 40 is dispersed in the forward and rearward direction in addition to the rightward and leftward direction. In this way, the vibration felt by the driver or passenger can be mitigated.

As described above, the rear drive motor 25, the rear transaxle 26, and the engine electric generator 30 are mounted to the common sub-frame 31, to form the assembly, and the assembly is mounted to the vehicle body 4 via the elastic bushes. To be more specific, the engine 40 generating a vibration, the rear transaxle 26 applied with a reactive force of a drive torque from the rear wheels 3, and the like are assembled to the common sub-frame 31. Such an arrangement makes it possible to effectively suppress the vibration from being transferred to the vehicle body 4 without increasing costs, as compared to a configuration in which the rear drive motor 25, the rear transaxle 26, and the engine electric generator 30 are individually mounted to the vehicle body 4 via the elastic mounts. Thus, the vibration felt by the driver or passenger can be mitigated.

In the engine electric generator 30 assembled to the common sub-frame 31, the cylinder block 42 and the like of the engine 40 protrude to the right, while the rear drive motor 24 protrudes to the left from the sub-frame 31. With the assembly incorporated into the hybrid vehicle 1, a weight balance in the rightward and leftward direction is easily maintained. This also has an advantage that the engine electric generator 30, the rear drive motor 25 and others can be mounted to the vehicle body 4 easily.

In FIGS. 3 and 4, reference symbols 32 and 33 designate air-intake ducts through which combustion air is supplied to the cylinder of the engine 40 through an air cleaner 34, a reference symbol 35 designates an air-intake duct used to cool the electric generator 60, a reference symbol 36 designates an air discharge duct through which the air is discharged from the electric generator 60. These components will be described in detail later. Moreover, in FIGS. 3 and 4, a reference symbol 37 designates a fuel tank for storing a fuel supplied to the engine 40.

—Engine Electric Generator—

Figure 6:
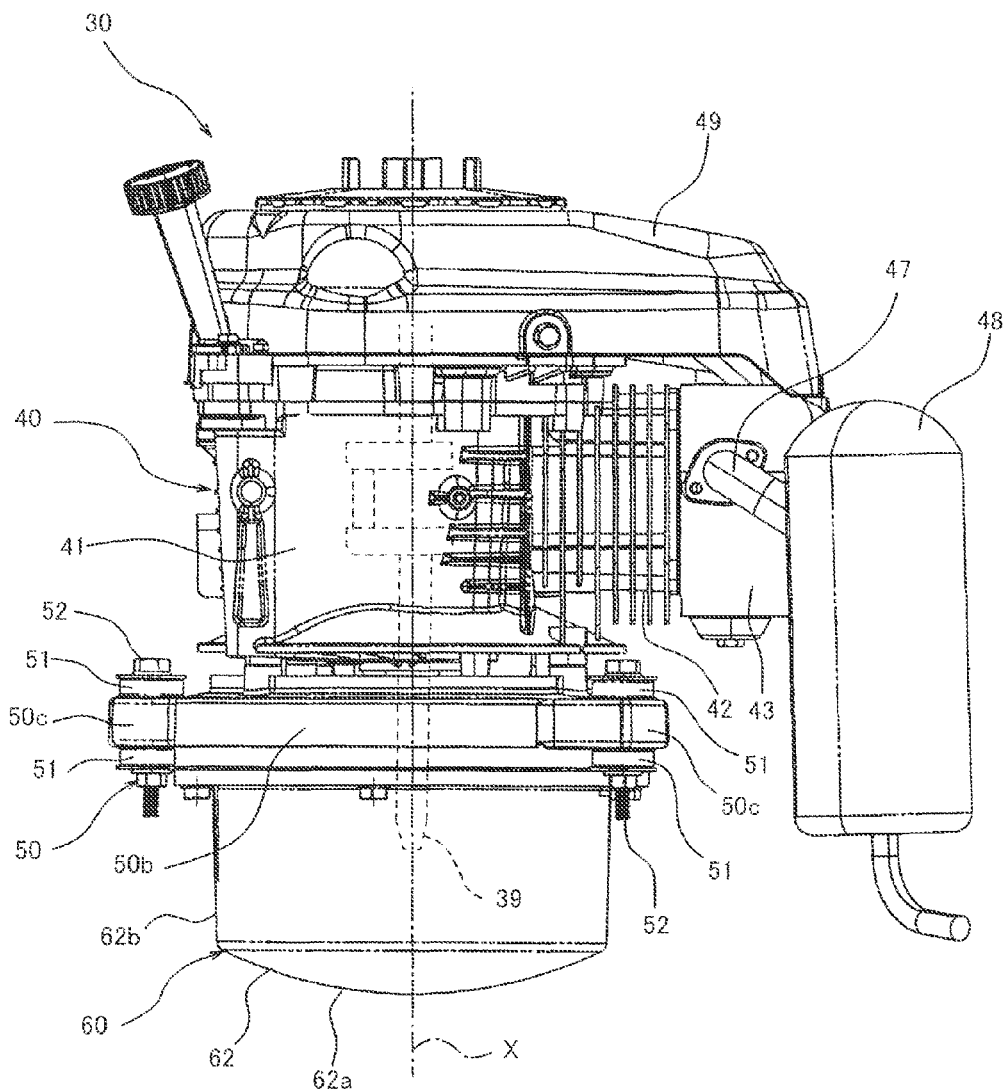
FIG. 6 is a side view of the engine electric generator when viewed from an exhaust system side of the engine.
Figure 7:
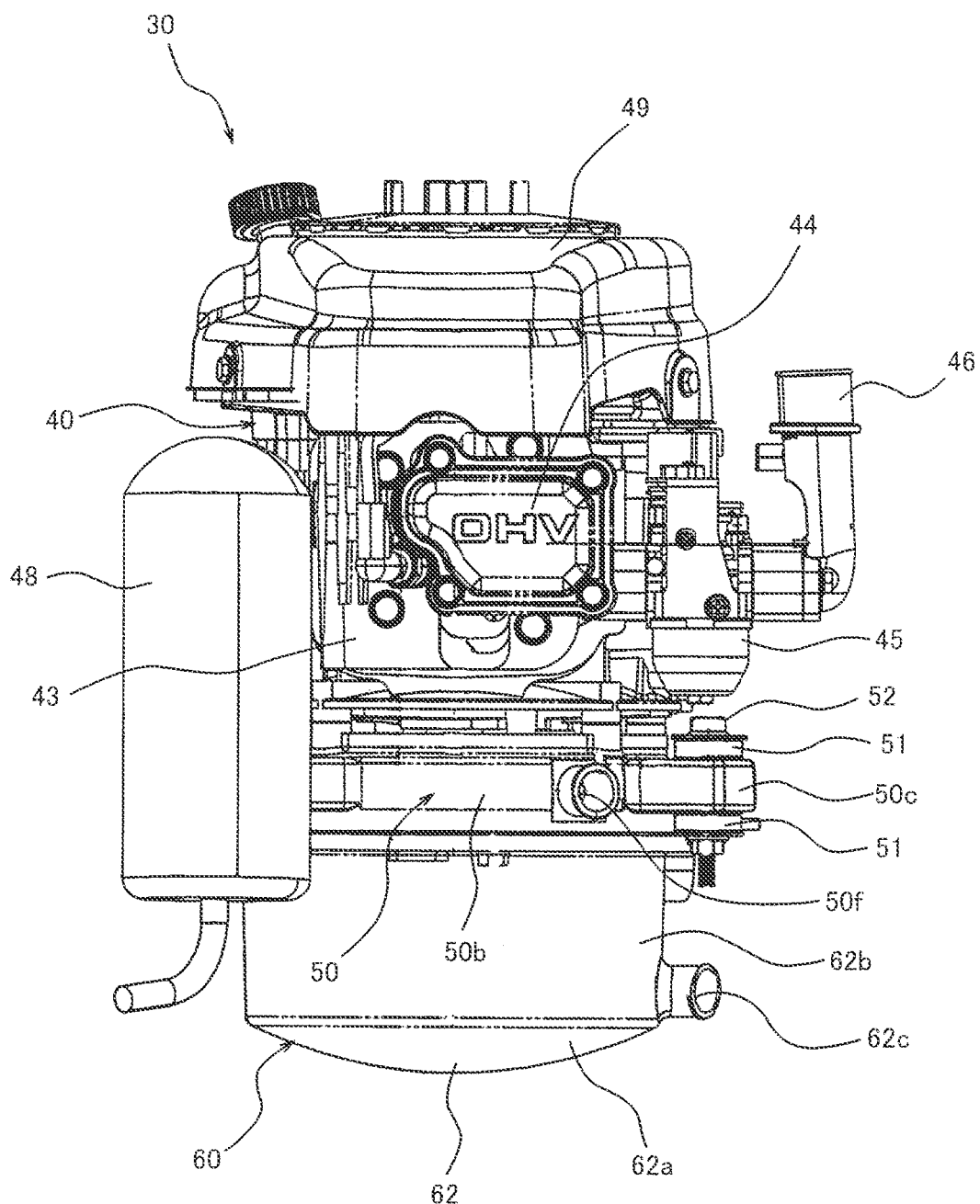
FIG. 7 is a side view of the engine electric generator when viewed from a cylinder head side of the engine.
Figure 8:
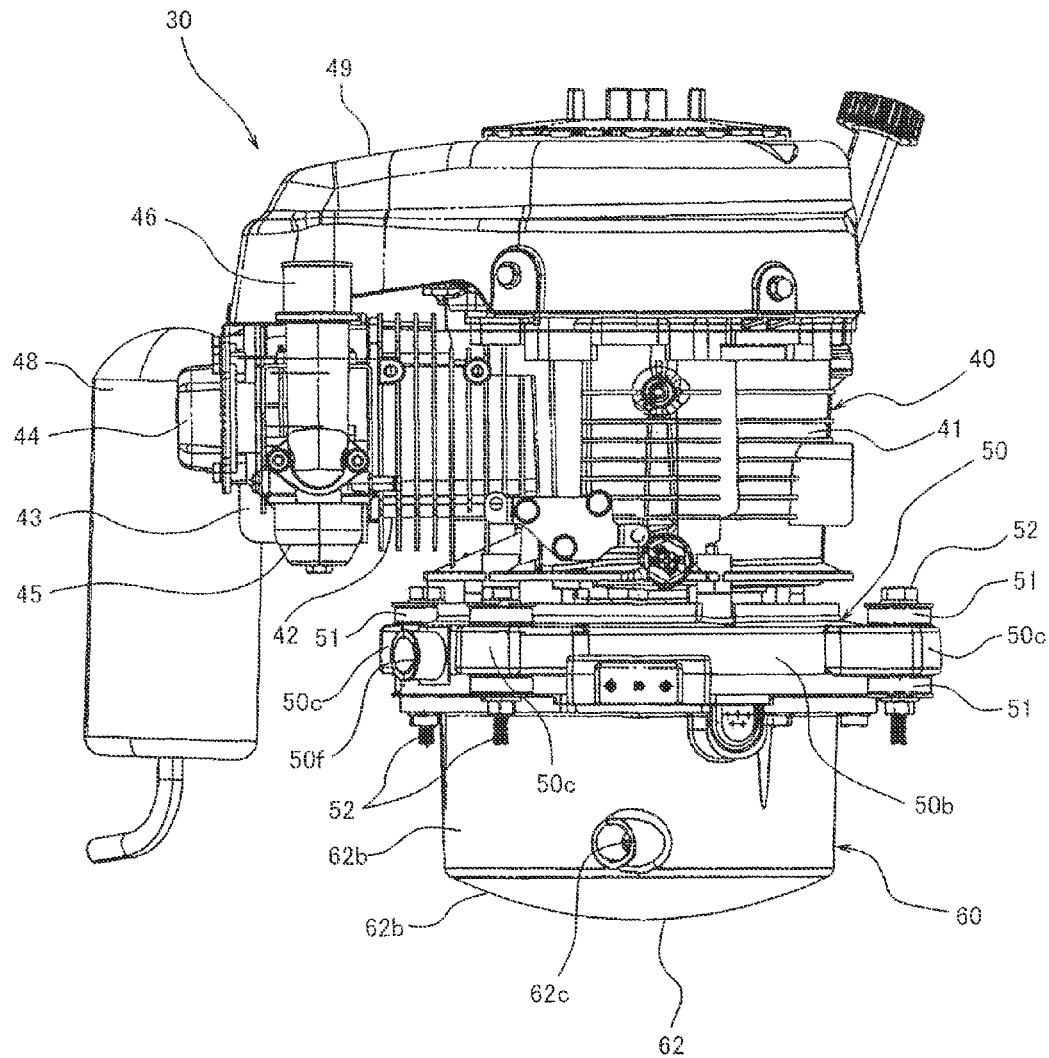
FIG. 8 is a side view of the engine electric generator when viewed from an air-intake system side of the engine.
Figure 9:
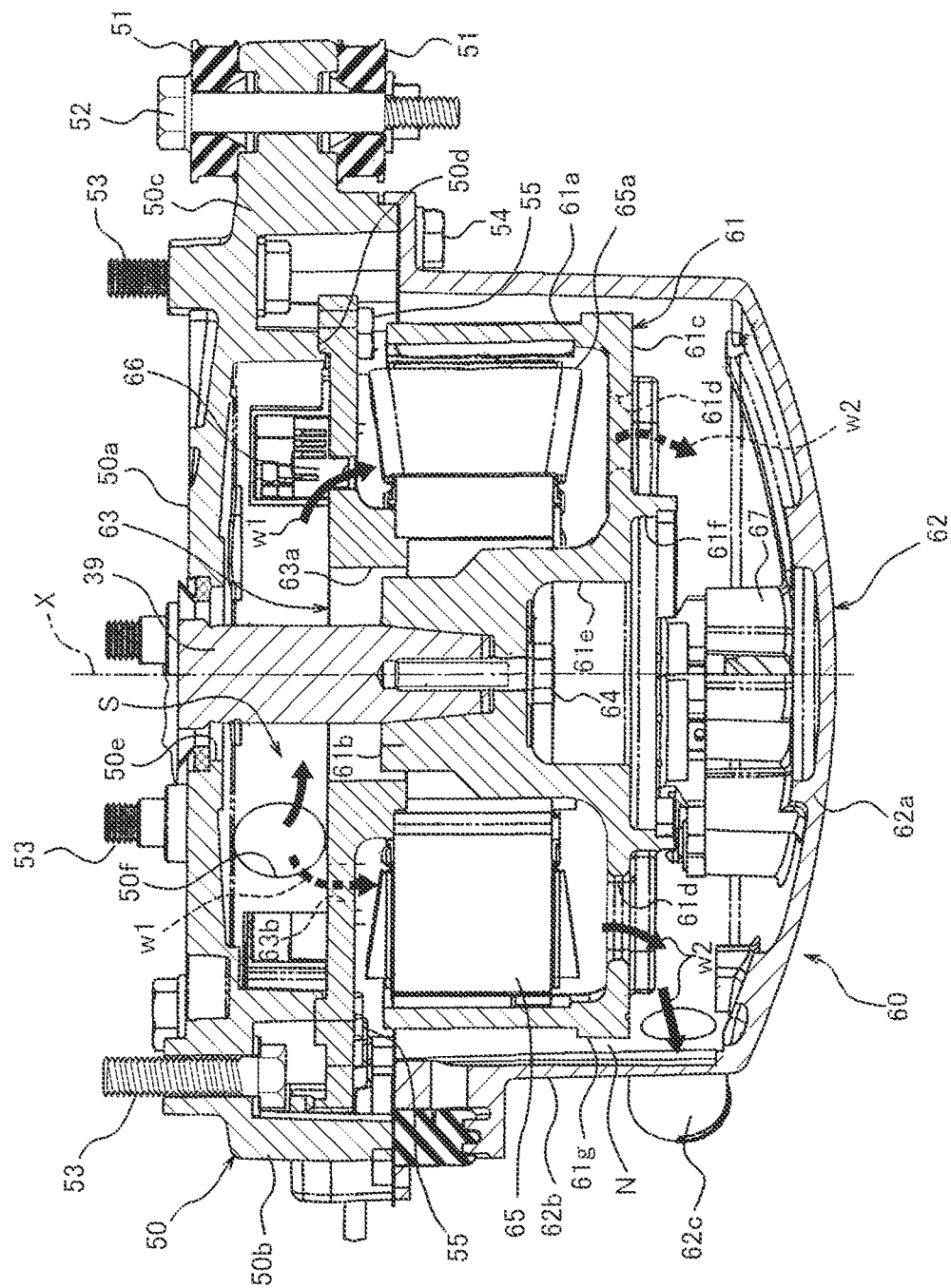
FIG. 9 is a longitudinal sectional view of the electric generator taken along a plane including a rotational axis of a rotor.

Next, the configuration of the engine electric generator 30 of the present embodiment, in particular, the cooling system of the electric generator 60, will be described with reference to FIG. 5, FIGS. 6 to 9, and others. FIGS. 6 to 8 are a side view of the engine electric generator 30 when viewed from the exhaust system side of the engine 40, a side view of the engine electric generator 30 when viewed from the cylinder head 43 side of the engine 40, and a side view of the engine electric generator 30 when viewed from the air-intake system side of the engine 40, respectively. FIG. 9 is a longitudinal sectional view of the electric generator 30 taken along a plane including a rotational axis X of a rotor 61, showing the internal configuration of the electric generator 60. It is supposed that the stated directions are referenced in the state where the engine electric generator 30 is incorporated into the utility vehicle 1.

As can be seen from FIGS. 6 to 8, the main body of the engine 40 has a configuration in which the cylinder head 43 is mounted to the right end of the cylinder block 42 extending substantially to the right from the crankcase 41. A head cover 44 is attached to the cylinder head 43. As can be seen from FIGS. 3, 4, and 6 to 8, a carburetor 45 and an air-intake pipe 46 are coupled to the front portion of the cylinder head 43. Outside air is suctioned into the cylinder via the air-intake ducts 32 and 33 and the air cleaner 34 (not shown in FIGS. 6 to 8). An exhaust pipe 47 and a muffler 48 are attached to the rear portion of the cylinder head 43 to exhaust combustion gas from the cylinder.

As shown in FIGS. 3 and 4, the upper end of the air-intake pipe 46 is coupled to the coupling portion of the upper end portion of the air cleaner 34 via the downstream air-intake duct 32 of a substantially-inverted-U shape, while the upstream air-intake duct 33 is coupled to the coupling portion of the rear portion of the air cleaner 34 and extends to the left. The air-intake duct 33 extends through a space under the tray 29 of the controllers 28 and then outward from a left front corner of the engine room R, and is coupled to the lower end portion of the support element 16a of the rear frame member 16 of the cabin frame 14.

To be specific, in the utility vehicle 1 of the present embodiment, the interior of the left portion of the round pipe member constituting the rear frame member 16 of the cabin frame 14 is used as an air passage. As can be seen from FIG. 3, an air inlet 16e of outside air opens in a portion of the cross beam 16b of the rear frame member 16, which is leftward relative to the center of the cross beam 16b, while an air outlet 16f is provided at the lower end portion of the left support element 16a of the rear frame member 16. The upstream air-intake duct 33 is coupled to the air outlet 16f. The right side portion of the rear frame member 16 is used to take the cooling air into the electric generator 60, as described later.

As indicated by broken lines in FIG. 6, the crankshaft 39 extends vertically inside the crankcase 41. The crankshaft 39 is coupled to a piston slidably inserted into the cylinder via a connecting rod, although not shown. The crankshaft 39 actuates an intake valve and an exhaust valve in the cylinder head 43 via a push rod, although not shown. As should be appreciated, the engine 40 includes an OHV valve operating system.

The upper end portion of the crankshaft 39 protrudes upward from the crankcase 41 and a sirocco fan (not shown) is mounted to the upper end portion of the crankshaft 39 such that the sirocco fan is rotatable integrally with the crankshaft 39. The sirocco fan is covered with a cover member 49 made of resin from above and from the side. The cooling air blowing out from the sirocco fan is guided to the cylinder block 42 and to the cylinder head 43 located below the sirocco fan. That is, the engine 40 uses a forcible air-cooling system.

The lower end portion of the crankshaft 39 protrudes downward from the crankcase 41. As shown in FIG. 9, the rotor 61 of the electric generator 60 is mounted to the lower end portion of the crankshaft 39 such that the rotor 61 is rotatable integrally with the crankshaft 39. As descried above, the case 62 of the electric generator 60 is mounted to the lower portion of the crankcase 41 of the engine 40 via the spacer member 50. The rotor 61 is accommodated in the case 62. The case 62 has a bottomed cylinder shape which opens upward. A separating plate 63 of a disc shape is mounted to the spacer member 50 to close the upper opening of the case 62. That is, in the present embodiment, the case 62 and the separating plate 63 define an accommodating member for accommodating the rotor 61.

As can be seen from FIG. 9, the spacer member 50 includes a disc-shaped flange portion 50a joined to the lower end surface of the crankcase 41 of the engine 40, a peripheral wall portion 50b extending downward along the outer periphery of the flange portion 50a, and the protruding portions 50c extending radially outward from predetermined three portions of the outer periphery of the peripheral wall portion 50b. The spacer member 50 couples the crankcase 41 of the engine 40 to the case 62 of the electric generator 60. The spacer member 50 is fastened to the sub-frame 31 by the protruding portions 50c on the outer periphery to support the overall engine electric generator 30 on the sub-frame 31.

To be specific, the spacer member 50 is fastened to the crankcase 41 (not shown in FIG. 9) in plural locations circumferentially spaced apart from each other on the peripheral wall portion 50b, by means of bolts 53, while an opening peripheral portion of the case 62 of the electric generator 60 is fastened to the lower end surface of the peripheral wall portion 50b in plural locations circumferentially spaced apart from each other, by means of bolts 54. A stepped portion 50d having a higher lower end surface is provided on the inner side of the peripheral wall portion 50b. The outer peripheral portion of the separating plate 63 is joined to the underside of the stepped portion 50d and fastened thereto in plural locations circumferentially spaced apart from each other, by means of bolts 55.

The flange portion 50a of the spacer member 50 and the separating plate 63 face each other in a vertical direction. A center hole 50e of a circular cross-section opens in the center portion of the flange portion 50a of the spacer member 50, while a center hole 63a of a circular cross-section opens in the center portion of the separating plate 63. The lower portion of the crankshaft 39 is inserted into the center holes 50e and 63a from above. A V-ring seals the center hole 50e of the flange portion 50a and the crankshaft 39. A space S is formed between the flange portion 50a and the separating plate 63 and surrounded by the peripheral wall portion 50b of the spacer member 50. A bus bar 66 is accommodated in the space S and connected to a plurality of electromagnetic coils 65a of a stator 65 as described later. An air inlet 50f opens in the peripheral wall portion 50b of the spacer member 50 so as to face the space S to take in outside air for cooling the electric generator 60. The air inlet 50f penetrates the peripheral wall portion 50b and extends substantially radially. As shown in FIGS. 7 and 8, the air inlet 50f protrudes to outside from the peripheral wall portion 50b of the spacer member 50. In the example shown in FIGS. 7 and 8, the air inlet 50f is provided below the carburetor 45 such that the air inlet 50f extends in an obliquely forward and rightward direction from the engine electric generator 30 in a state where the engine electric generator 30 is incorporated into the utility vehicle 1. The air-intake duct 35 is coupled to the air inlet 50f.

As shown in FIGS. 3 and 4, the air-intake duct 35 extends rightward and forward from the air inlet 50f, is gently curved along the inner side of the right rear side frame 19, extends to outside through a right front corner of the engine room R, and is coupled to the lower end portion of the right support element 16a of the rear frame member 16 of the cabin frame 14. As described above, the interior of the rear frame member 16 of the cabin frame 14 is the air passage. An air inlet 16g opens in the cross beam 16b at the right side of the air inlet 16e. An air outlet 16h is provided at the lower end portion of the right support element 16a. The air-intake duct 35 is coupled to the air outlet 16h.

When an internal pressure in the case 62 decreases according to the operation of the electric generator 60, the outside air is taken into the space S of the spacer member 50 from the air inlet 50f through the passage within the rear frame member 16 and the air-intake duct 35. The outside air is directed in the circumferential direction in the space S. As indicated by an arrow w1 in FIG. 9, the outside air, i.e., the cooling air, is introduced into the case 62 through a plurality of air introduction ports 63b of the separating plate 63, to cool the rotor 61 and the stator 65 of the electric generator 60.

The plurality of air introduction ports 63b are provided at the inner side of the separating plate 63 located above the rotor 61, to be precise, inward relative to a drum 61b of the rotor 61. The plurality of air introduction ports 63b are spaced a predetermined distance apart from each other around the rotational axis X of the rotor 61 to correspond to the plurality of electromagnetic coils 65a of the stator 65 as described later. The plurality of air introduction ports 63b are provided above the rotor 61 (opposite end side of the rotor 61 in the rotational axis X direction) to directly guide the cooling air to the plurality of electromagnetic coils 65a of the stator 65. In other words, the air introduction ports 63b are located at an upstream side relative to the rotor 61 in the air flow direction.

The rotor 61 and the stator 65 to which the cooling air is guided in this way have a known structure. For example, the rotor 61 has a fitting hole in the upper portion of a hub 61a such that the fitting hole opens upward. The tapered portion of the lower end portion of the crankshaft 39 is fitted into the fitting hole and is fastened to the hub 61a by means of a bolt 64. The rotor 61 has a unitary structure formed by, for example, casting, in which the hub 61a and the drum 61b surrounding the outer periphery of the hub 61a with a gap between them are integral with a flange portion 61c at a lower end of the rotor 61. When taken along a plane including the rotational axis X, the rotor 61 has a schematically W-shape as shown in FIG. 9.

For example, a neodymium magnet of a thin plate shape is attached to the inner peripheral surface of the drum 61b. Inward relative to the neodymium magnet, the stator 65 having the plurality of electromagnetic coils 65a is disposed in a circularly-annular space between the hub 61a at the center and the neodymium magnet. The stator 65 is mounted to an annular support portion surrounding the center hole 63a of the separating plate 63. The plurality of electromagnetic coils 65a are arranged at predetermined intervals on a circumference surrounding the rotational axis X of the rotor 61. As described above, the plurality of air introduction ports 63b are provided above the plurality of electromagnetic coils 65a, respectively.

The flange portion 61c of the rotor 61 which is located below the stator 65 to face the stator 65, has a plurality of air ports 61d arranged circumferentially at intervals substantially equal to those of the plurality of electromagnetic coils 65a. After cooling the rotor 61 and the plurality of electromagnetic coils 65a of the stator 65, the cooling air flows in a downward direction through the plurality of air ports 61d. That is, the cooling air introduced through the air introduction ports 63b of the separating plate 63, flows in a downward direction through a space between the drum 61b of the rotor 61 and the plurality of electromagnetic coils 65a of the stator 65, and then flows in a downward direction through the plurality of air ports 61d of the flange portion 61c of the rotor 61 as indicated by the arrow w2 in FIG. 9.

A recess 61e having a circular cross-section is formed on the lower surface of the center portion of the flange portion 61c such that the recess 61e is surrounded by the plurality of air ports 61d and extends upward. Between the recess 61e and the plurality of air ports 61d, a circularly-annular protruding wall portion 61f protrudes downward. A slit is formed in a predetermined location of the protruding wall portion 61f. An encoder 67 is disposed at a substantially center portion of a bottom portion 62a of the case 62 of the electric generator 60 and detects a rotational angle of the rotor 61. To be specific, the encoder 67 is placed such that a light emitting element and a light receiving element face each other and sandwich the protruding wall portion 61f between them in a radial direction. The encoder 67 outputs a pulse signal upon detecting the slit.

A circularly-annular protruding portion 61g is formed on the lower end portion of the outer peripheral surface of the drum 61b of the rotor 61 such that the protruding portion 61g protrudes radially outward. For example, the protruding portion 61g has a rectangular cross-section. A narrower space N is formed between the outer peripheral surface of the protruding portion 61g and the inner peripheral surface of a peripheral wall portion 62b of the case 62 which is located radially outward relative to the outer peripheral surface of the protruding portion 61g. The narrower space N makes it possible to efficiently discharge the air flow generated in the vicinity of the rotor 61 by the rotation of the rotor 61, through an air outlet 62c which opens in the peripheral wall portion 62b of the case 62 as described below.

Figure 10:
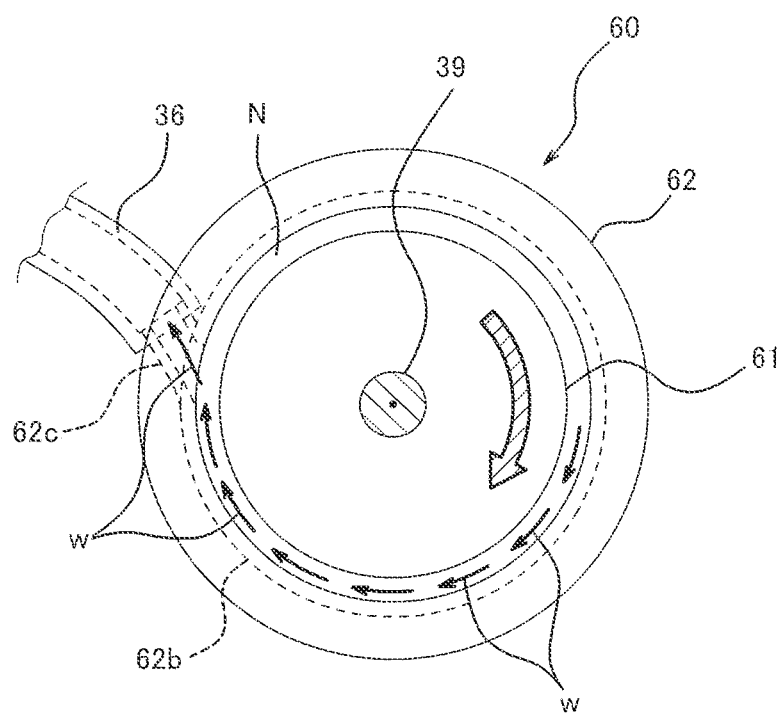
FIG. 10 is a view schematically showing an air outlet provided on a case of the electric generator and a flow of the air discharged through the air outlet, when viewed along the rotational axis of the rotor.

To be more specific, as shown in FIGS. 7, 8, and 9, the air outlet 62c is provided on the peripheral wall portion 62b of the case 62 of the electric generator 60 such that the air outlet 62c is positioned in the vicinity of the bottom (one end side in the rotational axis X direction) of the lower end portion of the rotor 61, i.e., in close proximity to the outer periphery of the rotor 61, in the vicinity of the narrower space N. As shown in FIG. 10, the air outlet 62c penetrates the peripheral wall portion 62b and extends radially outward such that it is tilted in a forward direction of a rotational direction of the rotor 61. Because of this, the air flow generated in the vicinity of the rotor 61 rotating is pushed outward toward the air outlet 62c and discharged efficiently to outside the case 62 through the air outlet 62c, as indicated by the arrow w in FIG. 10.

Figure 11:
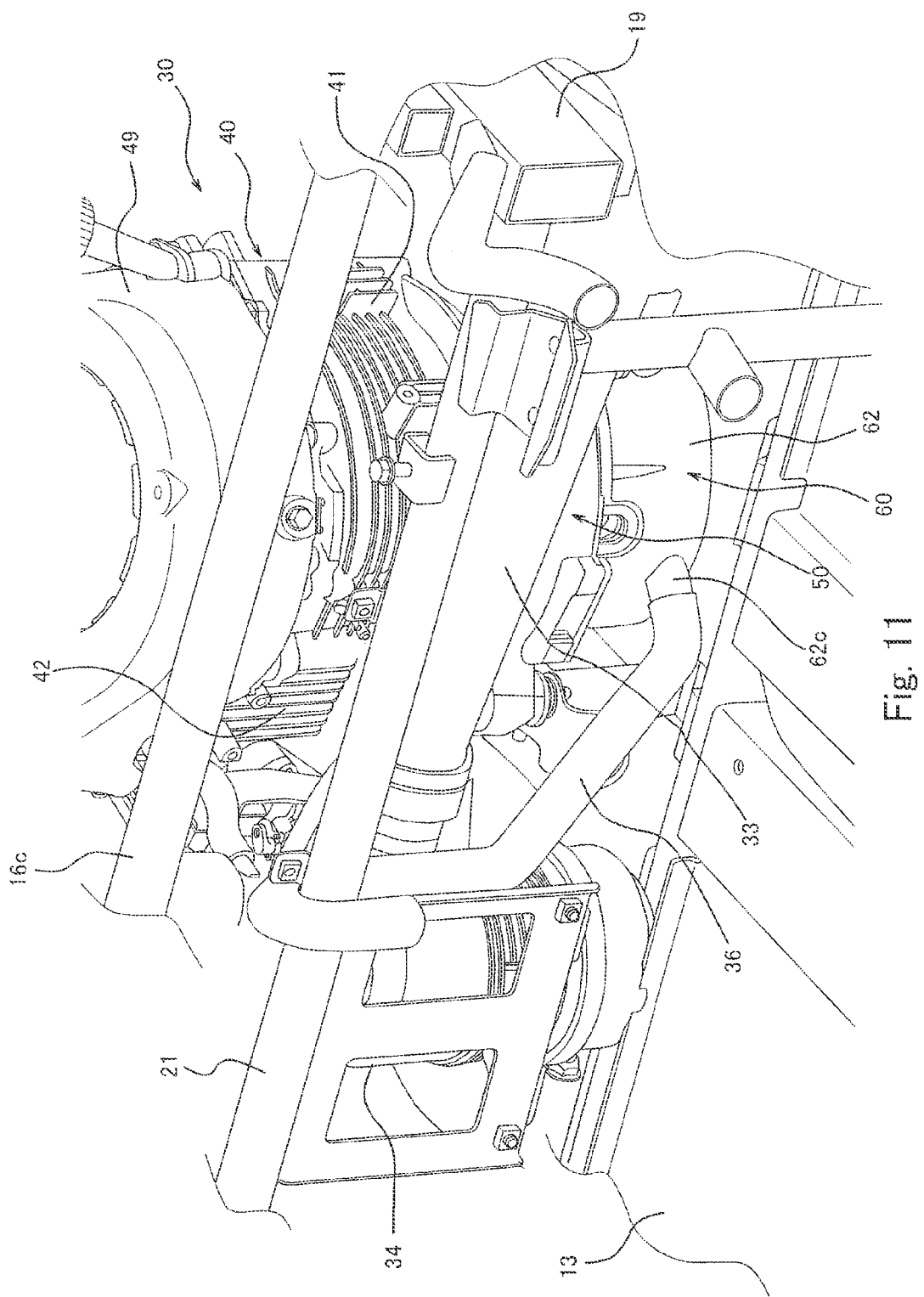
FIG. 11 is a perspective view of the hybrid vehicle when viewed from the front, showing an air discharge duct extending from the electric generator in an enlarged manner.

As shown in FIG. 11, the air discharge duct 36 is coupled to the air outlet 62c. In the present embodiment, the air discharge duct 36 extends from the air outlet 62c, forward and slightly rightward relative to the engine electric generator 60, is bent upward, and then extends forward and obliquely upward. As shown in FIGS. 3 and 11, the air discharge duct 36 is further bent behind the cross member 21 at the front end portion of the rear side frame 19, extends vertically upward, is curved to be wound around the cross member 21, and then opens vertically downward. In this way, the air discharge duct 36 extends up to a location as high as the cross member 21, and then is open in a downward direction. As a result, it is possible to facilitate discharging of the air from the electric generator 60, while preventing rain water, muddy water, debris, etc., from going into the case 62 of the electric generator 60.

When the engine 40 in the engine electric generator 30 starts and the rotor 61 starts rotating, the air flow generated in the vicinity of the rotor 61 rotating is discharged efficiently through the air outlet 62c provided on the peripheral wall portion 62b of the case 62 as described with reference to FIG. 10. In the present embodiment, because of the narrower space N formed between the peripheral wall portion 62b and the outer periphery of the rotor 61 in the vicinity of the air outlet 62c, a space between the protruding portion 61g of the rotor 61 rotating and the air outlet 62c is small. In this way, the air moving according to the rotation of the rotor 61 can be discharged efficiently.

Upon the air being discharged through the air outlet 62c, a pressure in the case 62 decreases, and the outside air is introduced into the case 62. The air flows into the air-intake duct 35 through the right passage of the rear frame member 16 of the cabin frame 14, and then is taken into the space S through the air inlet 50f of the spacer member 50. The air is directed in the circumferential direction in the space S, and is introduced in a downward direction as the cooling air through the plurality of air introduction ports 63b of the separating plate 63, toward the rotor 61 and the stator 65, to be precise, the plurality of electromagnetic coils 65a.

The cooling air (indicated by the arrow w1) introduced into the case 62 from above, flows in a downward direction through the space between the rotor 61 and the stator 65, i.e., from the opposite end side to one end side in the rotational axis X direction. The flow of the cooling air facilitates heat radiation from the magnet of the rotor 61 and the electromagnetic coils 65a of the stator 65. Then, as indicated by the arrow w2, the cooling air flows downward through the plurality of air ports 61d of the flange portion 61c of the rotor 61. At this time, the flow of the cooling air is added with a rotational flow component generated by the rotor 61, thereby resulting in a spiral air flow. The spiral air flow joins to the air flow generated in the vicinity of the rotor 61, and is discharged through the air outlet 62c of the peripheral wall portion 62b of the case 62.

In the present embodiment, the plurality of air introduction ports 63b are provided at the inner side of the separating plate 63, to be precise, inward relative to the drum 61b of the rotor 60. The cooling air introduced through the plurality of air introduction ports 63b flows in a downward direction and in a radially outward direction, and is thereafter discharged through the air outlet 62c provided on the outermost portion of the case 62. The flow of the cooling air facilitates heat radiation from the rotor 61 and the stator 65.

The cooling air is difficult to flow in the narrower space N formed between the lower end portion (annular protruding portion 61g) of the outer peripheral surface of the rotor 61 and the inner peripheral surface of the peripheral wall portion 62b of the case 62. In this way, the cooling air introduced through the air introduction ports 63b is suitably suppressed from flowing in a downward direction along the outer periphery of the rotor 61. This makes it possible to ensure the amount of cooling air flowing to the space between the rotor 61 and the stator 65, and hence facilitate heat radiation from the electromagnetic coils 65a of the stator 65.

In accordance with the electric generator 60 of the present embodiment, unlike an electric generator provided with a fan or the like rotatable according to the rotation of the rotor 61, air frictional resistance will not increase. The engine electric generator 30 can be cooled effectively while suppressing an increase in a driving loss of the engine electric generator 30 which would be caused by the air frictional resistance. In other words, in the utility vehicle 1 which does not require a high mobility, the electric generator 60 generating heat with a lesser amount can be cooled effectively with a simple configuration. Since the fan or the like is not required, costs will not increase.

In the present embodiment, the rotor 61 of the electric generator 60 is mounted to the lower end portion of the crankshaft 39 of the engine 40 which extends vertically in the engine electric generator 30. Therefore, even if high-temperature air in the vicinity of the engine 40 moves up by convection, during a stopped state of the hybrid vehicle 1 a temperature of the electric generator 60 positioned at a downstream side of the engine 40 will not increase. This is very effective in a case where the engine room R is provided below the cargo bed 18, as in the present embodiment.

—Other Embodiment—

The above embodiment is merely exemplary, and is in no way intended to limit the present invention, its applications and uses. Although the air outlet 62c is provided on the peripheral wall portion 62b of the case 62 in the vicinity of the bottom of the lower end portion of the rotor 61, the air outlet 62c may open to face the outer peripheral surface of the rotor 61. In this case, for example, the encoder 67 may be positioned on the upper portion of the crankshaft 39, to reduce a volume of the space formed below the rotor 61 in the vertical direction.

As described above, the air outlet 62c is provided on the peripheral wall portion 62b of the case 62 such that the air outlet 62c is positioned in the vicinity of the bottom of the lower end portion of the rotor 61. In addition to this structure, a dam portion may be provided in the vicinity of the air outlet 62c, to direct the air flow rotating along with the rotation of the rotor 61 toward the air outlet 62c. For example, the dam portion may be provided on the inner peripheral surface of the peripheral wall portion 62b of the case 62 in the vicinity of the air outlet 62c, preferably, at a downstream side relative to the air outlet 62c, in the air flow direction in the circumferential direction.

As described above, the air outlet 62c penetrates the peripheral wall portion 62b, extends radially outward, and is tilted in the forward direction of the rotational direction of the rotor 61. The air outlet 62c may be tilted in the rotational direction of the rotor 61, 30 degrees or greater with respect to a radial direction, preferably 45 degrees or greater with respect to the radial direction. More preferably, the air outlet 62c extends in the rotational direction of the rotor 61, i.e., a tangential line direction in which an inclination angle is 90 degrees.

Although the circularly-annular protruding portion 61g is provided on the outer peripheral surface of the rotor 61 to form the narrower space N between the peripheral wall portion 62b and the outer periphery of the rotor 61 in the vicinity of the air outlet 62c, the narrower space N need not be provided.

The introduction ports 63b through which the cooling air is guided to the rotor 61 and the stator 65 are not limited to the above stated location. Thus, in other embodiments the introduction ports 63b may be provided at a location other than at an opposite side of the air outlet 62c in the rotational axis X direction of the rotor 61, or may be positioned at a location other than inward relative to the drum 61b of the rotor 61. Moreover, the introduction ports 63b may be provided in a location that does not correspond to the electromagnetic coils 65a of the stator 65.

Furthermore, in the engine electric generator 30, the electric generator 60 may be mounted to the upper end portion of the crankshaft 39, or the engine electric generator 30 may be placed such that the crankshaft 39 of the engine 40 extends horizontally, and the rotor 61 of the electric generator 60 may be mounted to one end portion of the crankshaft 39 extending horizontally.

Although in the present embodiment, the utility vehicle 1 (multi-purpose vehicle) has been described so far as an example of the hybrid vehicle including the engine electric generator 30, the hybrid vehicle may be an all terrain vehicle (ATV), a two-wheeled hybrid vehicle, or a three-wheeled hybrid vehicle. The hybrid vehicle is not limited to the series hybrid vehicle, but may be a parallel hybrid vehicle, or a series-parallel hybrid vehicle.

As this invention may be embodied in several forms without departing from the spirit or essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric generator incorporated into a hybrid vehicle including an engine and an electric drive motor and actuated by the engine, comprising:
   a rotor mounted to one end portion of a crankshaft of the engine such that the rotor is rotatable integrally with the crankshaft, the rotor including a stator;
   an accommodating member having a cylindrical shape, for accommodating the rotor such that the accommodating member surrounds an outer periphery of the rotor; and
   a spacer member which is disposed between the engine and the accommodating member to couple a crankcase of the engine to the accommodating member; wherein the accommodating member includes a separating plate defining an accommodating space of the rotor at one end side in a rotational axis direction of the rotor;

an air inlet is provided to face a space surrounded by the spacer member and the separating plate;

the separating plate is provided with an introduction port of cooling air to directly guide the cooling air introduced from the air inlet to an end portion of the stator of the rotor in the rotational axis direction of the rotor; and a peripheral wall portion of the accommodating member is provided with an air outlet such that the air outlet opens in the vicinity of the outer periphery of the rotor and is tilted in a forward direction of a rotational direction of the rotor and in a radially outward direction.

2. The electric generator according to claim 1, wherein the accommodating member includes a case;

the air outlet is provided on a peripheral wall portion of the case such that the air outlet is at one end side in the rotational axis direction of the rotor; and the separating plate is provided with the introduction port on an opposite end side in the rotational axis direction of the rotor, the introduction port being located at an upstream side relative to the rotor in an air flow direction.

3. The electric generator according to claim 2, wherein the rotor includes a hub fastened to the one end portion of the crankshaft, and a drum surrounding an outer periphery of the hub such that the drum and the hub are spaced apart from each other;

a stator having an electromagnetic coil is disposed between the hub and the drum; and the introduction port is positioned inward relative to the drum when viewed in the rotational axis direction of the rotor.

4. The electric generator according to claim 3, wherein the introduction port includes a plurality of introduction ports arranged to be spaced apart from each other in a circumferential direction around the rotational axis of the rotor; and a passage is provided between the accommodating member and the engine to guide outside air from an outer periphery of the accommodating member to the plurality of introduction ports.

5. The electric generator according to claim 1, wherein a narrower space is provided between the peripheral wall portion of the accommodating member and the outer periphery of the rotor in a vicinity of the air outlet.

6. The electric generator according to claim 1, wherein the crankshaft extends vertically, and the rotor is mounted to a lower end portion of the crankshaft.

7. A hybrid vehicle including an engine and an electric drive motor, comprising:

an electric generator mounted to the engine, the electric generator including:

a rotor mounted to one end portion of a crankshaft of the engine such that the rotor is rotatable integrally with the crankshaft, the rotor including a stator;

an accommodating member having a cylindrical shape, for accommodating the rotor such that the accommodating member surrounds an outer periphery of the rotor; and a spacer member which is disposed between the engine and the accommodating member to couple a crankcase of the engine to the accommodating member;

wherein, the accommodating member includes a separating plate defining an accommodating space of the rotor at one end side in a rotational axis direction of the rotor;

an air inlet is provided to face a space surrounded by the spacer member and the separating plate;

the separating plate is provided with an introduction port of cooling air to directly guide the cooling air introduced from the air inlet to an end portion of the stator of the rotor in the rotational axis direction of the rotor; and an air outlet provided on a peripheral wall portion of the accommodating member such that the air outlet opens in the vicinity of the outer periphery of the rotor and is tilted in a forward direction of a rotational direction of the rotor and in a radially outward direction.

8. The electric generator according to claim 1, wherein the accommodating member further includes a case of a bottomed cylinder shape;

the separating plate has a disc shape; and the case and the separating plate are coupled to the spacer member by bolts, respectively.

9. The electric generator according to claim 1, wherein the rotor has a bus bar connected to an electromagnetic coil of the stator; and the bus bar is disposed in the space surrounded by the spacer member and the separating plate.

10. The electric generator according to claim 1, wherein the introduction port includes a plurality of introduction ports which are arranged to be spaced apart from each other around a rotational axis of the rotor.

11. The electric generator according to claim 1, wherein the rotor includes the stator having a plurality of electromagnetic coils which are arranged to be spaced apart from each other on a circumference surrounding a rotational axis of the rotor, and a flange portion disposed to face the stator in the rotational axis of the rotor; and wherein the flange portion is provided closer to the rotational axis of the rotor than the air ports.

12. The electric generator according to claim 11, wherein the introduction ports are provided closer to the rotational axis of the rotor than the air ports.

13. An electric generator incorporated into a hybrid vehicle including an engine and an electric drive motor and actuated by the engine, comprising:

a rotor mounted to one end portion of a crankshaft of the engine such that the rotor is rotatable integrally with the crankshaft;

an accommodating member having a cylindrical shape and surrounding an outer periphery of a rotor; and a spacer member which is disposed between the engine and the accommodating member to couple a crankcase of the engine to the accommodating member;

wherein the spacer member has a peripheral wall portion which is provided with an air inlet for introducing outside air to an inside of the accommodating member; and a peripheral wall portion of the accommodating member is provided with an air outlet such that the air outlet opens in the vicinity of the outer periphery of the rotor and is tilted in a forward direction of a rotational direction of the rotor and in a radially outward direction.

14. An electric generator incorporated into a hybrid vehicle including an engine and an electric drive motor and actuated by the engine, comprising:

a rotor mounted to one end portion of a crankshaft of the engine such that the rotor is rotatable integrally with the crankshaft;

an accommodating member having a cylindrical shape and surrounding an outer periphery of the rotor; and a spacer member which is disposed between the engine and the accommodating member to couple a crankcase of the engine to the accommodating member;

wherein the spacer member has a peripheral wall portion and is provided with an air inlet protruding from an outer periphery of the peripheral wall portion, to introduce outside air to an inside of the accommodating member such that an air flow is divided in a circumferential direction of the accommodating member; and a peripheral wall portion of the accommodating member is provided with an air outlet extending radially such that the air outlet opens in the vicinity of the outer periphery of the rotor and is tilted in a forward direction of a rotational direction of the rotor and in a radially outward direction.

15. An electric generator incorporated into a vehicle including an engine and an electric drive motor and actuated by the engine, comprising:

a rotor mounted to one end portion of a crankshaft of the engine such that the rotor is rotatable integrally with the crankshaft, the rotor including a stator;

an accommodating member having a cylindrical shape, for accommodating the rotor such that the accommodating member surrounds an outer periphery of the rotor; and a spacer member which is disposed between the engine and the accommodating member to couple a crankcase of the engine to the accommodating member; where the accommodating member includes a separating plate defining an accommodating space of the rotor at one end side in a rotational axis direction of the rotor;

an air inlet is provided to face a space surrounded by the spacer member and the separating plate;

the separating plate is provided with an introduction port of cooling air to directly guide the cooling air introduced from the air inlet to an end portion of the stator of the rotor in the rotational axis direction of the rotor; and a peripheral wall portion of the accommodating member is provided with an air outlet such that the air outlet opens in the vicinity of the outer periphery of the rotor and is tilted in a forward direction of a rotational direction of the rotor and in a radially outward direction.

16. A hybrid vehicle including an engine and an electric drive motor, comprising:

an electric generator mounted to the engine, the electric generator including:

a rotor mounted to one end portion of a crankshaft of the engine such that the rotor is rotatable integrally with the crankshaft;

an accommodating member having a cylindrical shape and surrounding an outer periphery of the rotor; and a spacer member which is disposed between the engine and the accommodating member to couple a crankcase of the engine to the accommodating member;

wherein the spacer member has a peripheral wall portion which is provided with an air inlet to introduce outside air to an inside of the accommodating member; and a peripheral wall portion of the accommodating member is provided with an air outlet which opens in the vicinity of the outer periphery of the rotor and extends to be tilted in a forward direction of a rotational direction of the rotor and in a radially outward direction.

17. A hybrid vehicle including an engine and an electric drive motor, comprising:

an electric generator mounted to the engine, the electric generator including:

a rotor mounted to one end portion of a crankshaft of the engine such that the rotor is rotatable integrally with the crankshaft;

an accommodating member having a cylindrical shape and surrounding an outer periphery of the rotor; and a spacer member which is disposed between the engine and the accommodating member to couple a crankcase of the engine to the accommodating member;

wherein the spacer member has a peripheral wall portion and is provided with an air inlet protruding from an outer periphery of the peripheral wall portion to introduce outside air to an inside of the accommodating member such that an air flow is divided in a circumferential direction of the accommodating member; and a peripheral wall portion of the accommodating member is provided with an air outlet extending radially such that the air outlet opens in the vicinity of the outer periphery of the rotor and is tilted in a forward direction of a rotational direction of the rotor and in a radially outward direction.

* * * * *